(12) United States Patent
Williams et al.

(10) Patent No.: US 11,926,710 B2
(45) Date of Patent: Mar. 12, 2024

(54) AEROBIC DEPOLYMERIZATION OF FIBER-REINFORCED COMPOSITES

(71) Applicant: UNIVERSITY OF SOUTHERN CALIFORNIA, Los Angeles, CA (US)

(72) Inventors: Travis J. Williams, Los Angeles, CA (US); Steven Nutt, Irvine, CA (US); Yijia Ma, Los Angeles, CA (US); Carlos Navarro, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 635 days.

(21) Appl. No.: 16/234,062

(22) Filed: Dec. 27, 2018

(65) Prior Publication Data

US 2019/0203013 A1 Jul. 4, 2019

Related U.S. Application Data

(60) Provisional application No. 62/611,060, filed on Dec. 28, 2017.

(51) Int. Cl.

| | |
|---|---|
| *C08J 11/28* | (2006.01) |
| *B01J 31/22* | (2006.01) |
| *B29B 17/02* | (2006.01) |
| *C01B 32/05* | (2017.01) |
| *C01B 32/354* | (2017.01) |
| *C08K 3/012* | (2018.01) |
| *C08K 5/00* | (2006.01) |
| *C08K 7/06* | (2006.01) |
| *D01F 9/12* | (2006.01) |
| *C08K 3/16* | (2006.01) |
| *C08K 3/22* | (2006.01) |
| *D01F 9/00* | (2006.01) |

(52) U.S. Cl.
CPC .......... *C08J 11/28* (2013.01); *B01J 31/2217* (2013.01); *B29B 17/0206* (2013.01); *C01B 32/05* (2017.08); *C01B 32/382* (2017.08); *C08K 3/012* (2018.01); *C08K 5/0033* (2013.01); *C08K 7/06* (2013.01); *D01F 9/12* (2013.01); *B01J 2231/70* (2013.01); *B01J 2531/0252* (2013.01); *B01J 2531/16* (2013.01); *B01J 2531/72* (2013.01); *B01J 2531/74* (2013.01); *B01J 2531/845* (2013.01); *C08J 2363/00* (2013.01); *C08K 3/16* (2013.01); *C08K 3/22* (2013.01); *C08K 5/0091* (2013.01); *D01F 9/00* (2013.01)

(58) Field of Classification Search
None
See application file for complete search history.

(56) References Cited

U.S. PATENT DOCUMENTS

2017/0174523 A1* 6/2017 Goh .................. B01J 27/13

OTHER PUBLICATIONS

Bedka et al. (Acta Innovations, ISSN 2300-5599, 26, 45-52). (Year: 2018).*

* cited by examiner

*Primary Examiner* — Yun Qian
(74) *Attorney, Agent, or Firm* — Brooks Kushman P.C.

(57) ABSTRACT

A method of aerobic depolymerization of fiber-reinforced polymer (FRP) composites using sustainable reagents and conditions. A cured matrix is digested into soluble monomers and oligomers by catalytic aerobic oxidation. Carbon fibers are removed for re-use, then the remaining material is treated and valuable monomers are isolated. The isolated monomers can be converted back into resin precursors for re-use. The method solves the problem created because the typically irreversible cure reaction impedes recycling and re-use of FRP composites.

16 Claims, 18 Drawing Sheets

Scheme 2A. Hitachi's Transesterification Conditions for Depolymerization of Acid Anhydride-Linked FRP Resins

*Mechanism:*

AEROBIC DEPOLYMERIZATION OF FIBER-REINFORCED COMPOSITES

CROSS-REFERENCE TO RELATED APPLICATIONS

This application claims the benefit of U.S. provisional application Ser. No. 62/611,060 filed Dec. 28, 2017, the disclosure of which is hereby incorporated in its entirety by reference herein.

STATEMENT REGARDING FEDERALLY SPONSORED RESEARCH OR DEVELOPMENT

The invention was made with Government support under Contract No. CHE1566167 awarded by the National Science Foundation. The Government has certain rights to the invention.

BACKGROUND

Fiber-reinforced polymer (FRP) composites have become a primary structural material in latest-generation commercial aircraft, because they are lighter and stiffer than Al alloys, resulting in reductions in both fuel consumption and maintenance. Uses include fuselage sections, wings, and control surfaces in aircraft such as the Boeing 787 Dreamliner[1] and the Airbus A350 XWB, both of which consist of more than 50 wt % composites. FRPs are also important in the alternative energy industry: FRPs are the primary structural material in wind turbine blades.[4] Composites are also widely seen in high performance sporting goods ranging from marine vessels to racing bicycles, golf shafts, skis, and ice hockey sticks. The market for carbon fiber composites is projected to reach of USD $20.1 billion by 2018.[2]

The range of applications of polymer composites is poised to expand. Recently, FRPs have emerged as potential replacements for structural metals in high-volume automotive applications. Particularly, the BMW i3 and 7 series models[4] use FRPs to save weight and reduce fuel consumption, which help meet stringent standards for greenhouse gas emissions. In addition, FRPs are being considered in civil infrastructure for structural retrofitting, power lines, and modular housing. The market for carbon fiber FRPs grows about 6.4% annually.[3] The expanded use of FRPs can enable environmentally friendly technological trends in sectors making large environmental footprints, including transportation and energy production. However, while environmentally beneficial, growth in the composites market creates a major sustainability problem: there is no efficient strategy for reusing or recycling composite materials at the end of their life.

FRPs contain long, continuous fibers (e.g., carbon, glass, or aramid) encased within a polymer matrix. The fibers provide high strength and stiffness, while the matrix maintains the part shape and fiber orientation, and transfers load. Both the embedded fibers and the polymer resin are highly engineered materials with substantial value, with carbon fibers driving both the cost and the energy demand of production.[1,2] Currently, the most common matrices, particularly in high-performance applications, are thermoset polymers, particularly epoxies. During FRP manufacturing, thermosets undergo polymerization/cross-linking (or cure), an irreversible chemical reaction that converts them from a viscous fluid into a stiff, hard solid. The permanent nature of this process is a major obstacle to recycling post-service parts (e.g., structures such as the examples in FIG. 1), as most FRPs are non-biodegradable and do not decompose by biological mechanisms. The chemistry of this cure is the magic of FRP manufacturing. Undoing the polymer structure in a mild, orderly way will necessarily require a new and equally ingenious piece of chemistry. A priori, if physical methods could be sufficient to disassemble these materials, then why did we need to engineer such elegant reaction-based methods to make them in the first place?

Among the most promising leads in this area is a variant of solvolysis developed by Hitachi Chemical that uses peroxide-based oxidation to cleave FRP resins (vide infra). Using this type of "de-polymerization" may ultimately enable the recovery of useful small molecules from the crosslinked polymer, which would for the first time preserve partial end value.[8] The process was demonstrated on acid anhydride-cured epoxy resin systems, rather than the more common amine-cured epoxies used in high-performance composites. Meeting the full promise of this strategy, requires invention of new pieces of chemistry that will become the lifecycle complement to resin cure.

Recycling approaches have been proposed and/or demonstrated, and these have been recently reviewed in the literature[2,3,6] Most commercial solutions focus on reclaiming the constituent with the highest economic value—the fibers—through the destructive removal of the resin matrix by thermal or chemical means.[6] Thermal recycling uses high temperatures to decompose the resin. While effective, it is energy-intensive and can degrade the fibers and leave behind solid and gaseous decomposition byproducts. Solvolysis is a physical process in which the resin matrix is dissolved using one or more solvents at near- or super-critical conditions. Recovery of resin components is feasible for some processes, but solution-based polymer processing is rarely used in composites manufacturing, and crosslinked polymeric materials (like FRP composite resins, vulcanized tires, butyl rubber, etc.) are not amenable to solution processing. This is why the cure chemistry is the magic and the power of FRP manufacturing. In both cases, recovered fibers lose their original orientation, and exhibit a distribution of lengths based on the geometry of the original structure. They are typically converted into a more homogenous product form (e.g., short fiber mats) before being re-used in other applications.

Some work has been directed toward designing resins that will depolymerize on demand. One such product, Recyclamine™,[9] is a hardener for epoxy resins that enables the breaking of crosslinks with heat and pH to enable recycling. Although an excellent strategy, it is advantageous to seek a solution that is applicable to the enormous volume of composites that are already in use and have no built-in degradation strategy. Further, a solution that does not require modifying the resin in a way that might compromise the performance of the FRP materials that are produced from it is preferred, particularly in hot weather or acidic rain.

In contrast, few research or commercialization efforts have focused on the reuse of in-process waste, even though the presence of uncured matrix enables direct upcycling. are discussed below.

Accordingly, there is a need for new and improved methods for recycling FRPs.

SUMMARY

The present invention solves one or more problems of the prior art by providing a reuse approach based on converting waste into an intermediate product form and using it to produce value-added composites.

In another aspect, a method of aerobic depolymerization of fiber-reinforced composites that allows recovery of useful small-molecule monomers and composite fibers to reduce waste and promote recycling of end-of-life FRP composites is provided. This method would solve the problem caused by irreversible curing by applying catalytic methods to selectively cleave FRP matrices to. Catalysis is used to degrade cured composite materials under mild conditions while enabling re-isolation of undamaged fibers and resin monomers.

In another aspect, a method of aerobic depolymerization of fiber-reinforced polymer (FRP) composites is provided. The method includes a step of providing a FRP matrix (e.g., solid and/or cured) for recycling. The FRP matrix is degraded with a matrix digest solution having one or more catalysts to recover the carbon fibers. Characteristically, air is used as a terminal oxidant in this degradation reaction. Advantageously, fibers are removed from the digest solution after the FRP matrix has been solubilized (preferably immediately after).

In yet another aspect, a method of aerobic depolymerization of fiber-reinforced polymer (FRP) composites is provided. The method includes a step of providing a FRP matrix FRP for recycling. The FRP matrix is degraded with a matrix digest solution having an oxygen transfer catalyst and an elimination catalyst to recover the carbon fibers. Advantageously, fibers are removed from the digest solution after the FRP matrix has been solubilized.

Advantageously, catalytic depolymerization of various cured resins based on $H_2O_2$, is demonstrated and expanded in a method of aerobic (air) oxidation using new catalysts. In particular, a way to collect oligomers of high molecular weight, drive the reaction to completion, and isolate valuable products in the process is provided by this method.

DETAILED DESCRIPTION

Figure 1:
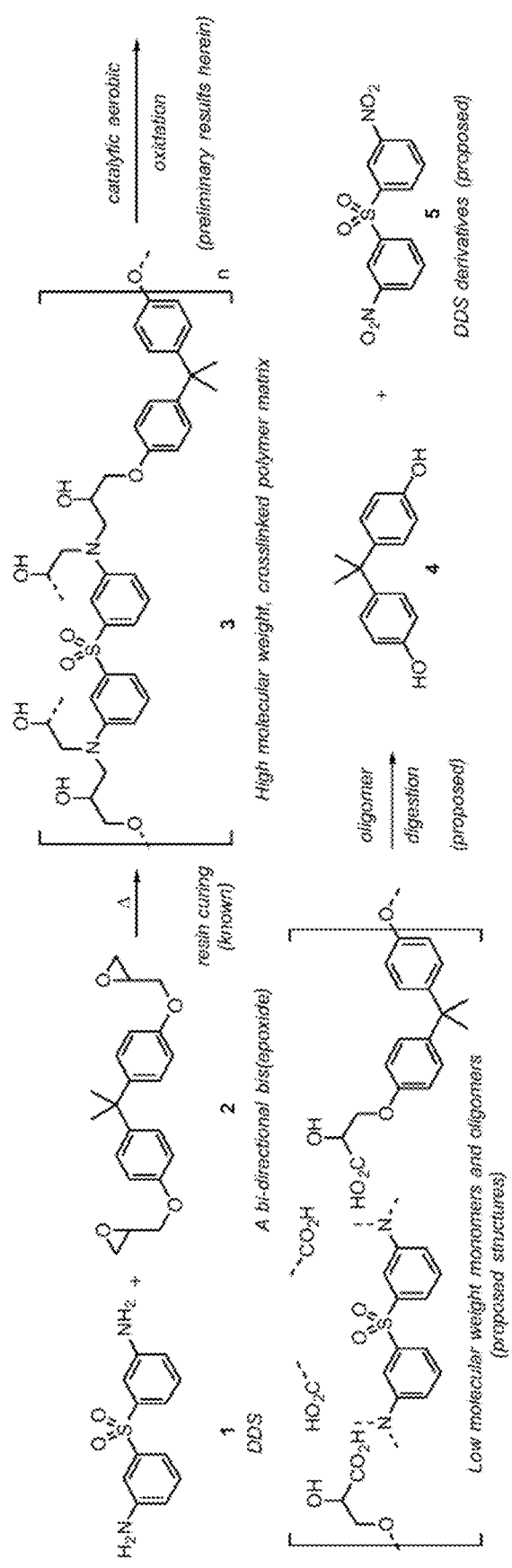
FIG. 1. A. Curing and catalytically depolymerizing an amine-linked epoxy composite matrix.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. where i is an integer) include alkyl, lower alkyl, $C_{1-6}$ alkyl, $C_{6-10}$ aryl, or $C_{6-10}$ heteroaryl; single letters (e.g., "n" or "o") are 1, 2, 3, 4, or 5; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

"salen" means "salicylaldehyde-ethylene diamine" and is based on the following general chemical structure:

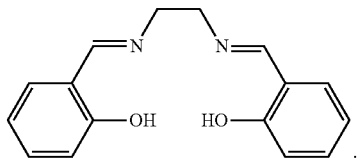 [SMILES: Oc1ccccc1/C=N/CC/N=C/c1ccccc1O]

"salen-derivative" means:

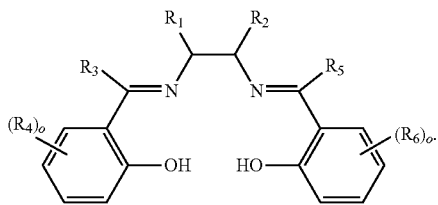

wherein:
$R_1$, $R_2$ are H, lower alkyl or joined together to form a 5 or 6 member aliphatic or aromatic ring;
$R_3$, $R_5$ are H or lower alkyl;
$R_4$, $R_6$ are H, lower alkyl, halo, nitro, cyano, and the like; and
o, p are each independently 0, 1, 2, 3, or 4.

The term "transition metal" as used herein means an element whose atom has an incomplete d sub-shell, or which can give rise to cations with an incomplete d sub-shell. Examples of useful transition metals for M include, but are not limited to, Cu, Ni, Co, Cr, Mn, Fe, W, Mo, Ti, Zr, Hf, Rf, V, Nb, Ta, Re, Ru, Rh, Ir, Pd, Pt, Sc, and Au.

The term "alkyl" refers to $C_{1-20}$ inclusive, linear (i.e., "straight-chain"), branched, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a C18 alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms.

ABBREVIATIONS

FRP means fiber-reinforced polymer.
CRFP means carbon fiber-reinforced polymer.
"DDS" means bis(aniline)sulfone.
"BPA" means bisphenol A.
"CAN" means $(Ce(NH_4)_2(NO_3)_6)$,
"PES" means "polyether sulfone."

In an embodiment, a method of aerobic depolymerization of fiber-reinforced polymer (FRP) composites is provided. The method includes a step of providing an FRP matrix, and in particular, a solid and/or cured FRP matrix for recycling. The FRP matrix can include B-staged prepregs prior to cure or cured prepregs that have undergone gelation and vitrification. The FRP matrix is degraded with a matrix digest solution having one or more catalysts to recover the fibers. In particular, the FRP matrix is contacted with the matrix digest solution at a first predetermined temperature. In a refinement, the first predetermined temperature is from about 50° C. to 220° C. Characteristically, an oxygen source (e.g., air) is used as a terminal oxidant in this degradation reaction. Advantageously, fibers (e.g., carbon fiber) are removed from the digest solution after the FRP matrix has been solubilized (preferably immediately after). In addition to carbon fibers, glass, aramid, and other organic polymer fibers or ceramic fibers can also be used.

Characteristically, the step of contacting the FRP matrix is performed for a first predetermined time period of from about 1 hour to 30 days. In a refinement, the first predetermined time period is at least, in increasing order of preference, 1 hour, 2, hours, 5 hours, 1 day, 3 days, or 5 days and at most 60 days, 30 days, 20 days, 10 days, 7 days or 1 day.

The matrix digest solution includes one or more catalysts suspended or dissolved in a suitable solvent. In particular, the catalyst contains Al and/or a transition metal such as Cu, Ni, Co, Cr, Mn, Fe, W, Mo, Ti, Zr, Hf, Rf, V, Nb, Ta, Re, Ru, Rh, Ir, Pd, Pt, Sc and Au. In a refinement, the catalyst includes a chloride, oxide, or acetate of the transition metal. In other refinement, the catalyst includes the transition metal and one or more ligands. Such ligands can be can be monodentate or multidentate ligand (e.g., a bidentate ligand), charged ligand (e.g., −1 charged such as halide), a neutral ligand, or a combination thereof. Particularly useful ligands include phenanthroline, salen, and derivatives thereof. The (salen)M complex or (salen-derivative)M complex can have the following formula:

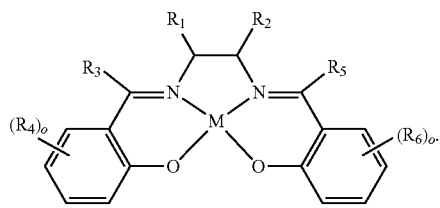

wherein:

$R_1$, $R_2$ are H or lower alkyl or joined together to form a 5 or 6 member aliphatic or aromatic ring;

$R_3$, $R_5$ are H or lower alkyl;

$R_4$, $R_6$ are H, lower alkyl, halo, nitro, cyano, and the like; and o, p are each independently 0, 1, 2, 3, or 4.

M is Al or a transition metal such as Cu, Ni, Co, Cr, Mn, Fe, W, Mo, Ti, Zr, Hf, Rf, V, Nb, Ta, Re, Ru, Rh, Ir, Pd, Pt, Sc, or Au.

Examples of solvents include, but are not limited to, water, $C_{1-12}$ alcohols, non-polar solvents, polar solvents, hydrocarbon solvents (e.g., ethyl ether, cyclohexane, toluene, and benzene). Typically, the amount of catalyst t is about 1 mg to 0.1 g per ml of solvent.

In a variation, the FRP matrix is an amine-linked epoxy matrix. In a variation, the catalyst is a transition metal-containing catalyst. In one refinement, the matrix blocks are degraded using $MeReO_3$ and/or oxides and halides of Mn(II), Cu(I) Re(VII), Re(V), and Re(III) as a catalyst. In another variation, they are degraded using $C_6H_8O_6$ as a catalyst. In a refinement, the catalyst is $ScCl_3$ or $AlCl_3$. In a further refinement, the catalyst is an oxomanganese salt or an oxomanganese chelate. In another refinement, a (salen) Co complex or (salen-derivative)Co complex is used as a catalyst. In yet another refinement, the one or more catalysts includes a component selected from the group consisting of $AlCl_3$, $Sc(OAc)_3$ and $Al(OAc)_3$.

The method further includes harvesting the resin monomers after disconnecting the linking fragments. In an embodiment, the isolated resin monomers are valuable aromatic compounds. In a variation, the resin monomers are then converted into resin precursors. In a refinement, conversion into resin precursors is done by treating with Fe/HCl conditions. In another refinement, conversion into resin precursors is done by re-alkylation.

In a variation, treatment with the matrix digest solutions with oxidative conditions is continued for a second predetermined time period at a second predetermined temperature and at tunable $O_2$ and catalyst concentrations to provide a controlled release of useful monomers. In a refinement, the second predetermined time period is at least, in increasing order of preference, 1 hour, 2, hours, 5 hours, 1 day, 3 days, or 5 days and at most 60 days, 30 days, 20 days, 10 days, 7 days or 1 day. Typically, the second predetermined temperature is lower than the first predetermined temperature. In a refinement, the first predetermined temperature is from about 40° C. to 200° C. In particular, the method further includes a step of treating the remaining matrix material to disconnect remaining linked fragments. In a variation, the remaining matrix material is treated under oxidative conditions to enable selective oligomer digestion and monomer decomposition. In another variation, the matrix material is treated with a dealkylation agent to separate the resin monomers. In a refinement, the dealkylation agent is KOH. In another refinement, the dealkylation agent is HBr. In further refinements, the dealkylation agent is HI, KI, NaOH, or another metal hydroxide. In an alternate variation, the matrix material is treated with a strong base to separate the resin monomers from the remaining linked fragments. In one embodiment, the linked fragments are glycerol-based. In a variation, recovered organic materials are used as an accelerator for polymer curing.

In another embodiment, a method for degrading or recycling a FRP matrix (e.g., solid and/or cured) is provided. The method includes a step of providing a FRP matrix for recycling. The FRP matrix is degraded with a matrix digest solution having an oxygen transfer catalyst and an elimination catalyst to recover the fibers. In this context, the OAT catalyst adds oxygen to the nitrogen atom in an amine-cured epoxy resins to form an amine oxide while the elimination catalyst removes the oxygen atom to form an imine. In particular, the FRP matrix is contacted with the matrix digest solution at a first predetermined temperature. In a refinement, the first predetermined temperature is from about 50° C. to 220° C. Characteristically, an oxygen source (e.g., air) is used as a terminal oxidant in this degradation reaction. In a refinement, a hydrolysis is performed after the FRP matrix is contacted with the digest solution. Advantageously, fibers (e.g., carbon fiber) are removed from the digest solution after the FRP matrix has been solubilized. As set forth above, the first predetermined time period is at least, in increasing order of preference, 1 hour, 2, hours, 5 hours, 1 day, 3 days, or 5 days and at most 60 days, 30 days, 20 days, 10 days, 7 days or 1 day.

Examples of OAT catalysts include, but are not limited to, $MeReO_3$, manganese salts and chelates, cobalt salts and chelates, copper salts and chelates, and ascorbic acid. Examples of elimination catalysts include, but are not limited to, $ScCl_3$, $BF_3$, $AlCl_3$, $Sc(OAc)_3$, $B(OAc)_3$, $Al(OAc)_3$. Typically, the amounts of the OAT catalyst and elimination catalyst are each independently about 1 mg to 0.1 g per ml of solvent.

In each of the methods set forth above, the FRP matrix can be pretreated with a pretreatment solvent prior to degradation. Such pretreatment is a solvolysis that permeabilize the FRP matrix. Examples of such pretreatment solvents include, but are not limited to, benzyl alcohol, aromatic solvents (e.g., toluene, xylenes, etc.) and glycols, and ethers (e.g. dimethoxyethanol and glyme-based ethers).

The following examples illustrate the various embodiments of the present invention. Those skilled in the art will recognize many variations that are within the spirit of the present invention and scope of the claims.

The examples set forth below demonstrate catalytic depolymerization of various cured resins. Conditions have been identified to degrade the material shown in Scheme 1 (FIG. 1) based on hydrogen peroxide ($H_2O_2$). The examples illustrate a transition from peroxide to aerobic (air) oxidation using new catalysts. Moreover, the examples demonstrate successful re-isolation of carbon fibers from CFRP composites involving both epoxy and benzoxazine based matrices. Although it has been showed that small molecules can be recovered from polymer deconstruction, the best conditions for CFRP digestion either (1) did not drive the depolymerization reaction to full completion, and/or (2) degraded the isolable monomers that are desirable to be recovered. It is now found (Scheme 1) that oligomers of high molecular weight (ca. 4-100 monomers) can be collected. Moreover, as this reaction is driven to completion, valuable products like BPA (4) and DDS (1) degrade in the conditions (e.g. to 5 and various waste materials).

1. First Examples and Experimental Design

Figure 3A:
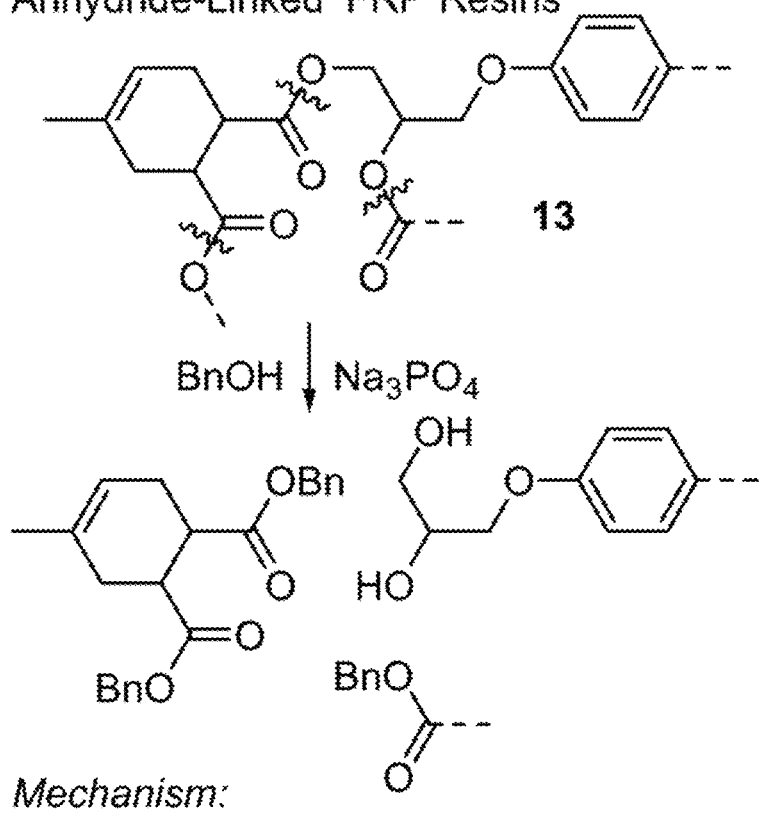
FIGS. 3A, 3B, and 3C. Molecular mechanisms for cleavage of FRP resins based on (A) acid anhydride, (B) amine, and (C) benzoxazine curing chemistries.
Figure 3A:
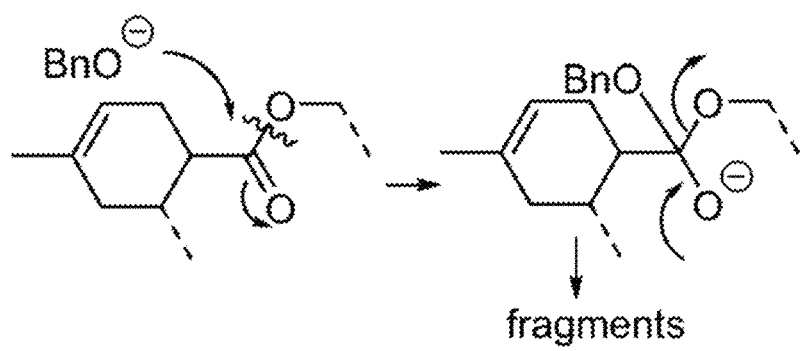
Figure 3B:
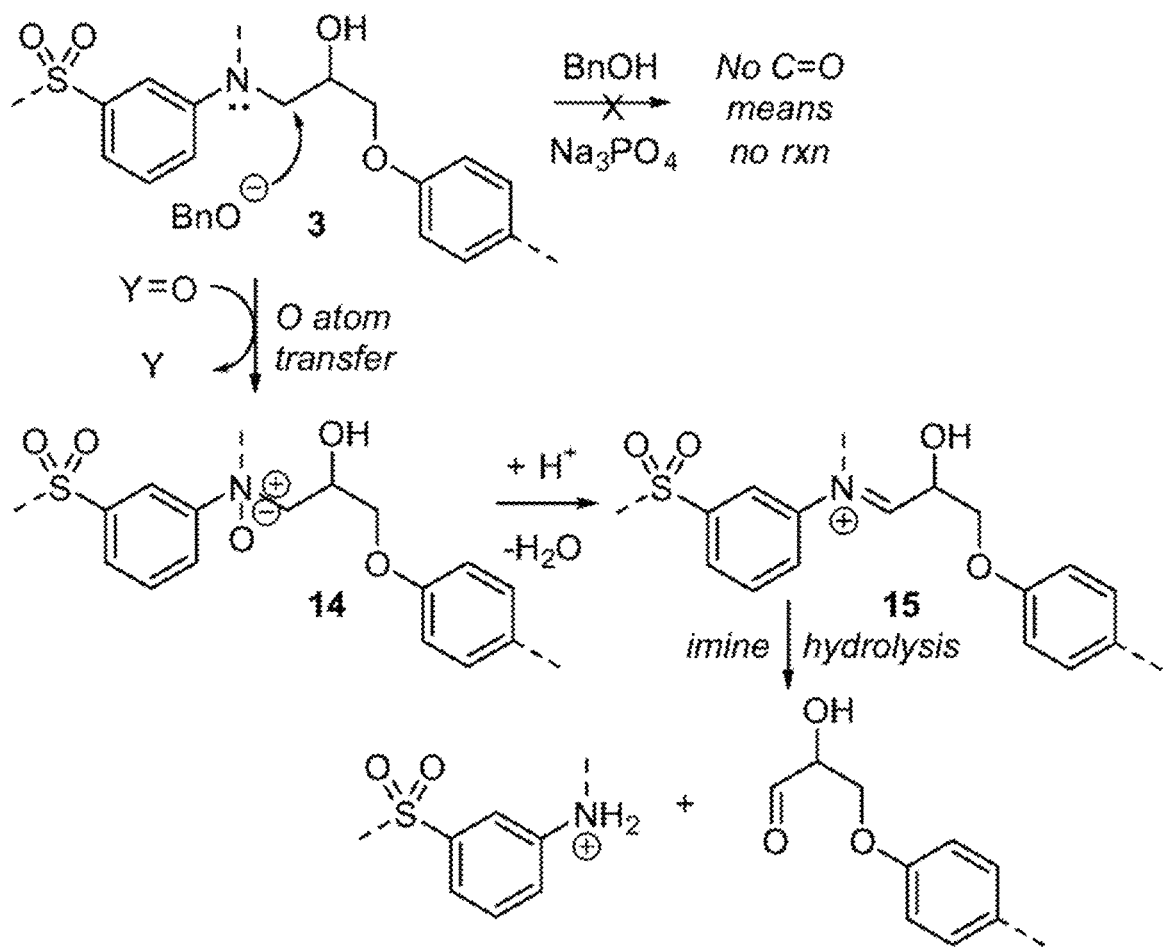
Figure 3C:
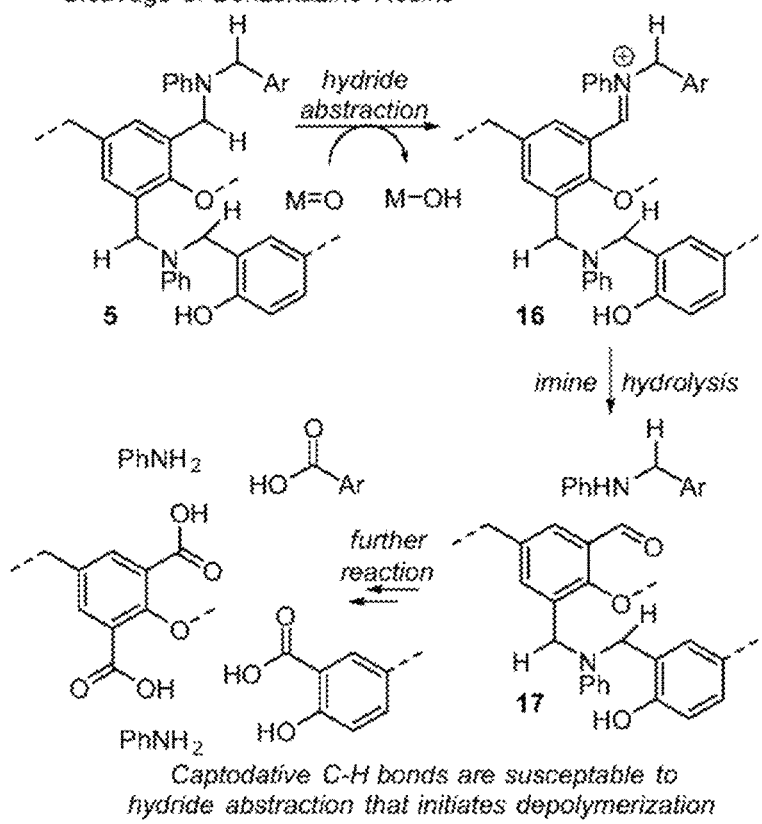

Proof-of-concept experiments on FRP recycling were performed as follows. The first approach harnesses oxidative degradation, a variant of solvolysis developed by Hitachi Chemical. Unlike thermal or harsh chemical degradation, this technique may enable the recovery of useful small molecules from the resin under mild conditions. The current disadvantage of depolymerization is its limited applicability: the process was developed and demonstrated only for polyesters, acid anhydride-cured epoxy resin systems. It is found that this route is viable for amine-cured epoxy resins with fully cured glass transition temperatures ranging from 60° C. to 210° C., although it occurs much more slowly than in polyesters (Scheme 2A in FIG. 3A). The molecular mechanisms that account for this difference are now understood. The experiments set forth below provide conditions to extend this depolymerization concept to a wide range of FRP matrices.

Conditions[10] for the cleavage of acid anhydride-cured epoxies to amine-cured epoxies are markedly slower to break down under the conditions engineered to cleave esters (FIG. 2): this is easily understood (FIG. 3A) because the transesterification mechanism available to anhydride-cured resins, which are fundamentally polyesters, is unavailable to the molecular architecture of the amine-cured materials. Noting this distinct difference in performance, the experiments focused on de novo design of conditions targeted to cleavage of the specific linking functionalities present in two classes of FRP resins: amine-cured epoxies and bis([benzo]oxazine)methane-based resins (a.k.a. benzoxazines), which are perceived to be both centrally important in the FRP field and selectively degradable. This section shows how oxygen atom transfer (OAT) and hydride abstraction catalysis have been used respectively to degrade amine-based and benzoxazine resins. These reactions are conceptually sketched in FIG. 3 parts B and C. The current conditions respectively involve hydrogen peroxide and ceric ammonium nitrate as terminal oxidants. Both of these have surmountable sustainability problems, and both have given valuable insights into the mechanics of how the reactions work.

Figure 2:
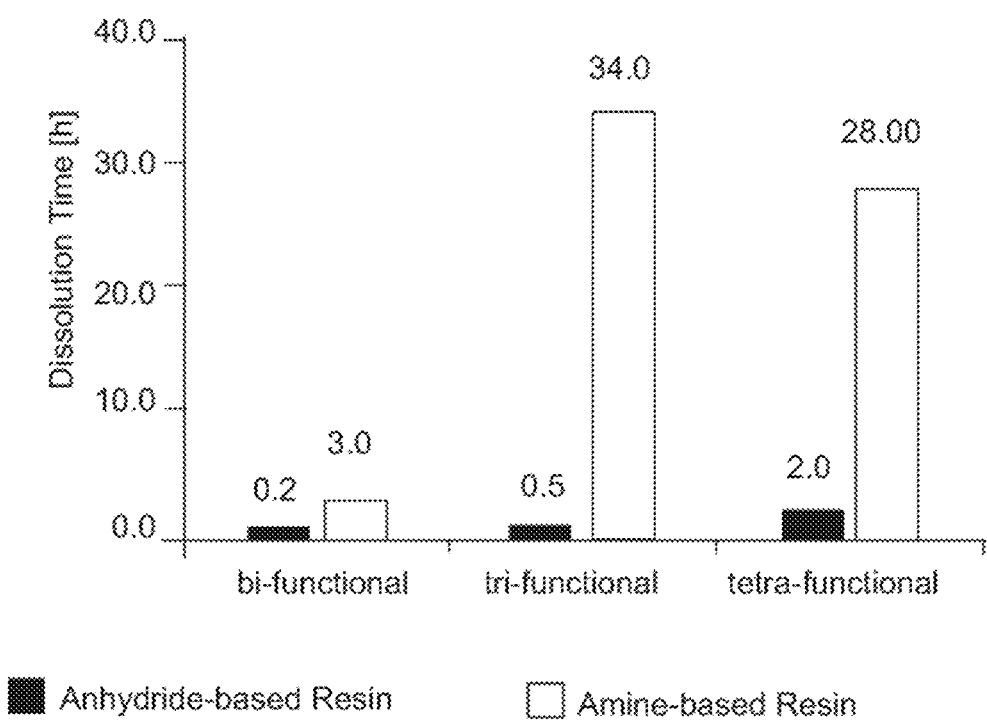
FIG. 2. Depolymerization times for anhydride- and amine-cured epoxies.
Figure 4:
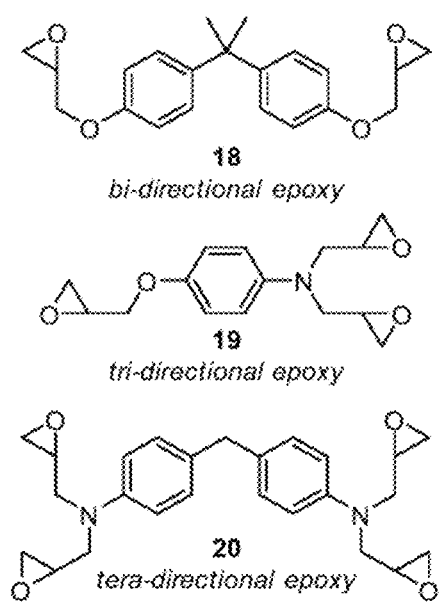
FIG. 4. Multi-directional epoxy monomers.

1.1 Depolymerization of Amine-Cured Epoxy-Based FRP Resins: Previously-Disclosed Prior Art Complete homogenization of some amine-linked epoxies using solvolysis conditions has been realized (FIG. 2). It is now known that faster depolymerization of these materials can be effectuated using oxidative acidic peroxide conditions, demonstrated using 3 classes of epoxies (FIG. 4), respectively enabling bi- tri- and tetra-directional resin crosslinking with bis(aniline)sulfone 1 as a curing agent. Resins prepared from these monomers were then digested in a medium of acetic acid and 30% hydrogen peroxide. In a representative experiment, 1 g sample was placed in a 1 L flask with 60 mL acetic acid and 10 mL hydrogen peroxide solution (30%). The resulting mixture was refluxed (110° C. bath) with 5 mL additional $H_2O_2$ (aq.) added every hour.

Figure 5:
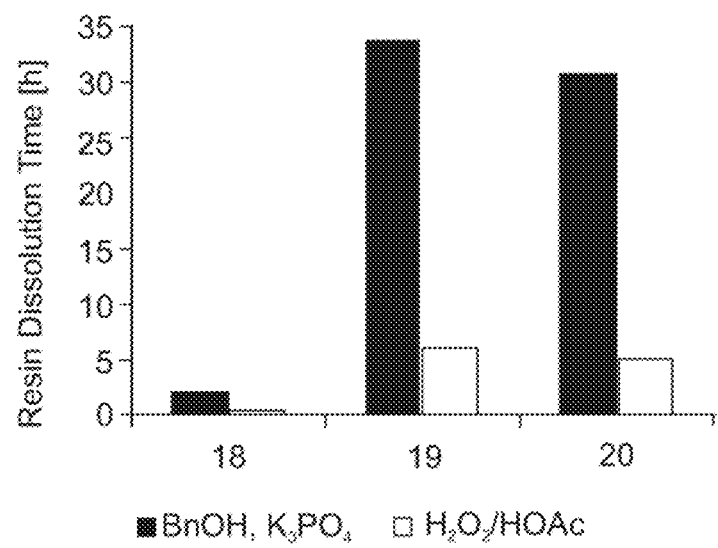
FIG. 5. Resin dissolution time of anhydride resin and amine based resin using acid digestion and depolymerization. BnOH=benzyl alcohol, $C_6H_5CH_2OH$.

In the amine cured resin system, the digestion time for a bi-functional resin (based on 18) was 3 hours, which is comparable to that of an anhydride-based resin. However, for tri- and tetra-functional resins (from 19, 20), the deconstruction is much faster with oxidative degradation, compare >30 hours to 5-6 (FIG. 5). Whereas the benzyl alcohol solvolysis conditions (BnOH, $K_3PO_4$) were developed to depolymerize poly(ester)s, it stands to reason that this oxidative approach would be superior when applied to an ester-free resin. Furthermore, an oxidatively-sensitive functionality, the matrix's dialkylaniline groups, should react with an oxidant like $H_2O_2$. This reaction appears to proceed by oxygen atom transfer (OAT) to aniline as sketched in FIG. 3B. This oxidative step is expected to be the slow step in the degradation mechanism, and thus the aspect of the chemistry that should be optimized.

The relatively slow rate of resin degradation with tri- and tetra-directional crosslinks compared to their bidirectional congener (FIG. 5) teaches that permeability of the more highly crosslinked resins with solvents and reagents is a key engineering challenge. Thus, the experiments surprisingly show that the efficacy of oxidative degradation is improved if the resin is pre-treated with solvolysis conditions to permeabilize it. When a resin formed from bidirectional epoxide 18 and bis(aniline) 1 (40% v epoxide) in benzyl alcohol at 200° C. (above the $T_g$ at 170° C.) is heated prior to oxidative degradation, more than 40% reduction in resin dissolution time is observed for all samples.

Figure 6:
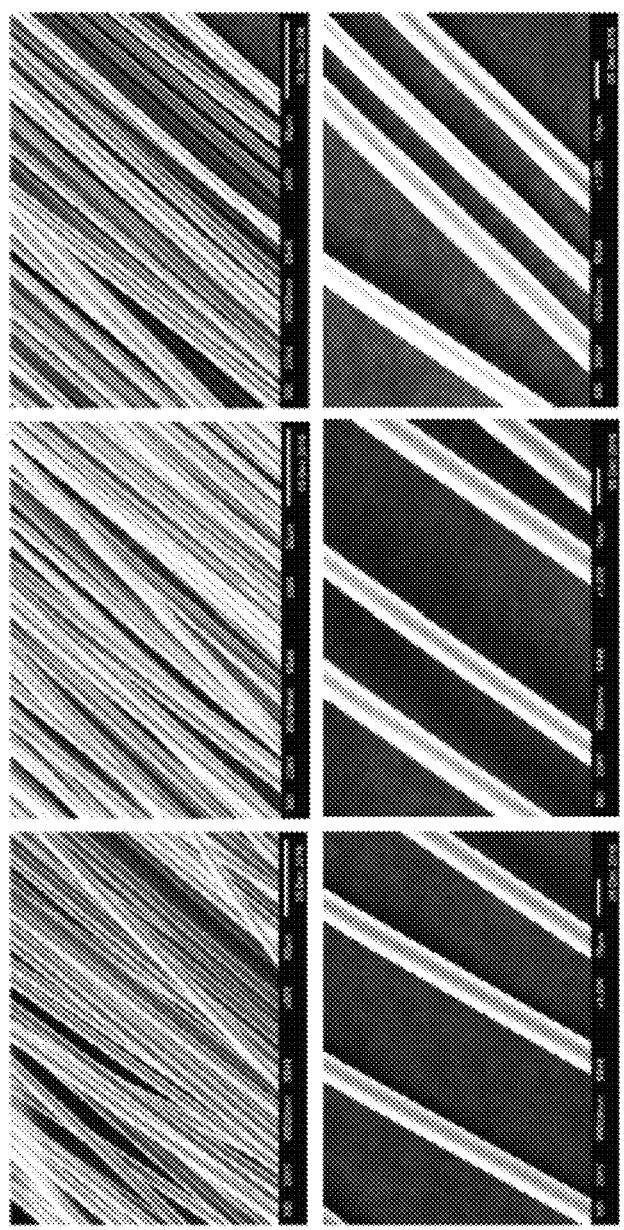
FIG. 6. SEM images of carbon fibers that are (left) virgin, (center) recovered by solvolysis, and (right) recovered by oxidative degradation.

These conditions are surprising because pristine carbon fibers can be recovered from digested FRP panels based on resin monomers 1 and 18 (1:1 ratio). FIG. 6 shows SEM images of virgin carbon fibers (left) and those that are re-isolated from a resin panel that was depolymerized by (center) solvolysis and (right) oxidative degradation. These data reveal that the strongly oxidative conditions of peroxide in acetic acid do not damage the fibers under conditions reasonable for depolymerization of a bi-directional resin. Data also show that embedded fibers will be stable as conditions are optimized to depolymerize more extensively crosslinked materials.

Taking these data together, the path to optimization of this degradation strategy involves (1) identifying efficient pre-treatment conditions followed by (2) find catalytic OAT conditions that can intercalate the labialized matrix and utilize $O_2$ itself, thus obviating $H_2O_2$, and (3) identify and accelerate the rate-limiting step in the catalysis.

1.2 Depolymerization of Benzoxazine-Based FRP Resins: Previously-Disclosed Prior Art.

Bis([benzo]oxazine)methane-based FRP resins (benzoxazines) are a relatively small-market, high-performance class of composites that have outstanding thermal performance and excellent chemical and corrosion resistance.[11] Consistent with their excellent chemical resistivity, benzoxazine-based FRPs are refractory to any of the deconstruction chemistry that has succeeded with epoxies. Therefore, embodiments of the invention provide a recycling approach for benzoxazine FRPs as sketched in FIG. 3C. It was found that a catalyst formed from $RuCl_3$ will effectuate full homogenization of the resin in the presence of CAN (Ce $(NH_4)_2(NO_3)_6$), a cerium(IV)-based, strong single electron oxidant (ca. +1.6 V). This result teaches that it is possible to overcome the chemical inertness of benzoxazine, and that a small molecule catalyst can effectuate bond cleavage reactions in or on the surface of the CRFP material without pre-permeabilization. It is encouraging that the carbon fibers survive resin removal substantially undamaged, even in the presence of $Ce^{IV}$. Surprisingly, carbon fibers were collected, which are undamaged and retain their long-range order.

2. Catalytic Degradation of Composite Thermoset Matrices by Catalytic Oxidation Using Sustainable Reagents and Conditions These experiments focus on amine-cured epoxies because they are widely used in the manufacture of high-performance composites, and thus present the greatest sustainability issue. It is known that these resins can be oxidatively degraded using acidic hydrogen peroxide solutions, but this solution has two disabling problems. First, hydrogen peroxide is an unsustainable (expensive, explosive) reagent that will not be deployed on aircraft or automotive scale. Not only is it not sustainable, it is also a safety issue. Second, selectivity is compromised in that the experiments show that these conditions degrade the matrix monomers and destroy their value. It is further shown here that the mechanism for peroxide-based matrix digestion involves oxygen atom transfer (OAT) to aniline, as outlined in FIG. 3B.

2.1 Catalysis in the OAT Mechanism. Move to Aerobic (Air Oxidation) Conditions.

Figure 7:
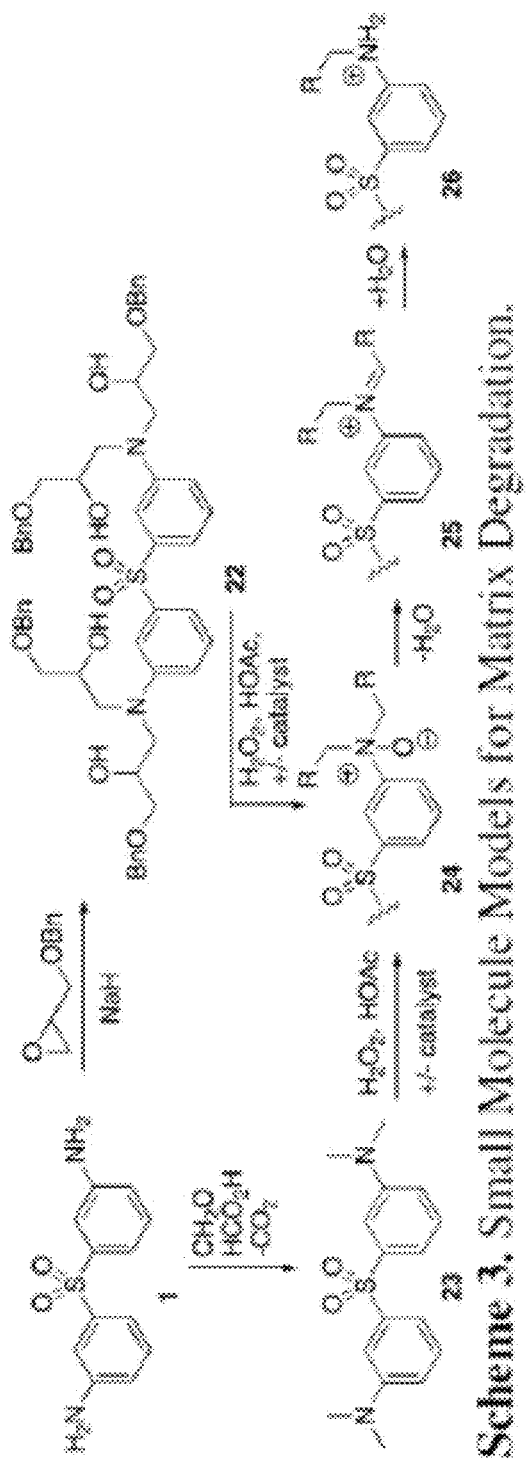
FIG. 7. Multi-Directional Epoxy Monomers

It is found as depicted in Scheme 3 of FIG. 7 that 23 converts to 24 in minutes at 80° C. in the presence of $H_2O_2$ and the absence of catalyst, then the conversion of 24 to 25 (R=H) takes days at 80° C. and does not go to completion. It is also observed that (1) catalysts such as $MeReO_3$,[12] (oxo)manganese salts and chelates,[13] ascorbic acid, and (salen)Co complexes[14] will enable efficient conversion of 23 to 24 in air in the absence of peroxide, and (2) Catalysis is useful and important in the elimination (cleavage) of 24. Preliminary findings indicate that Lewis acids such as $BF_3$ and $ScCl_3$ are effective in this aim. For example, it is found by NMR that addition of $ScCl_3$ to a peroxide-mediated cleavage reaction of 23 enables the conversion of 24 to downstream products, where no reaction beyond 24 is observed in the absence of $ScCl_3$. Treating neat matrix blocks with these conditions enables a 30% decrease in the time to homogenize the matrix in the presence of scandium. Therefore, it is found that Lewis acid catalysis ($ScCl_3$ in this example), will be important in the digestion scheme, because it appears that conversion of N-oxide intermediates is kinetically relevant.

Figure 8:
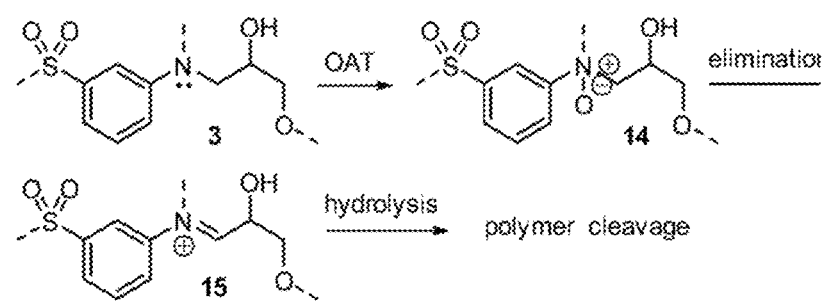
FIG. 8. Small molecule models for matrix degradation.

Scheme 4 depicted in FIG. 8 summarizes the mechanism for matrix polymer cleavage, which was validated for peroxide conditions using a monomeric model system (Scheme 5, below). It is surprising to find that elimination of the N-oxide intermediate (14) is slower than OAT. It was found that Lewis acids such as $BF_3$ and $ScCl_3$ are effective catalysts for the elimination and cleavage of the N-oxide intermediate (e.g. 14). For example, it is observed by NMR that addition of $ScCl_3$ to a peroxide-mediated cleavage reaction of a homogeneous model of 14 enables its conversion to downstream products, where no reaction is observed in the absence of $ScCl_3$. Treating neat matrix blocks with these conditions enables a 30% decrease in the time to homogenize the matrix in the presence of scandium.

OAT catalysts are developed to effectuate the degradation selectively, and with air as the oxygen source. Initial screens with known OAT catalysts (e.g. $MeReO_3$, manganese salts and chelates, ascorbic acid, cobalt salts and complexes) did not enable degradation of polymer matrices in air in the absence of peroxide or a Lewis acid.

It is suspected that incorporation of the elimination catalyst might accelerate the overall catalytic reaction to the point that one could transition from peroxide to air by incorporating a second catalyst for the OAT reaction to oxidize aniline with air. This was successful. Thus, it is shown that neat matrix blocks can be homogenized catalytically using air as the terminal oxidant when treated with catalysts for both elimination ($ScCl_3$) and OAT ($MeReO_3$). This has been shown two reactors containing matrix blocks digested in acetic acid for 20 hours at 110° C., each with 1 wt % $ScCl_3$ and respectively containing 1 wt % $MeReO_3$ or ascorbic acid as a catalyst for O-atom transfer from $O_2$. This is a major finding, because it shows that conditions exist for aerobic matrix digestion.

3.0 Demonstrate Optimal Conditions on Cured FRP Panels and Parts

Depolymerization conditions can be demonstrated on realistic composite parts with flat and curved geometries from commercial amine-cured carbon fiber/epoxy composite prepregs. These structures are depolymerized using optimal process conditions. More, these parts may include tougheners and other additives that might frustrate the depolymerization scheme. To date, the matrix has been removed from such samples.

Figure 9:
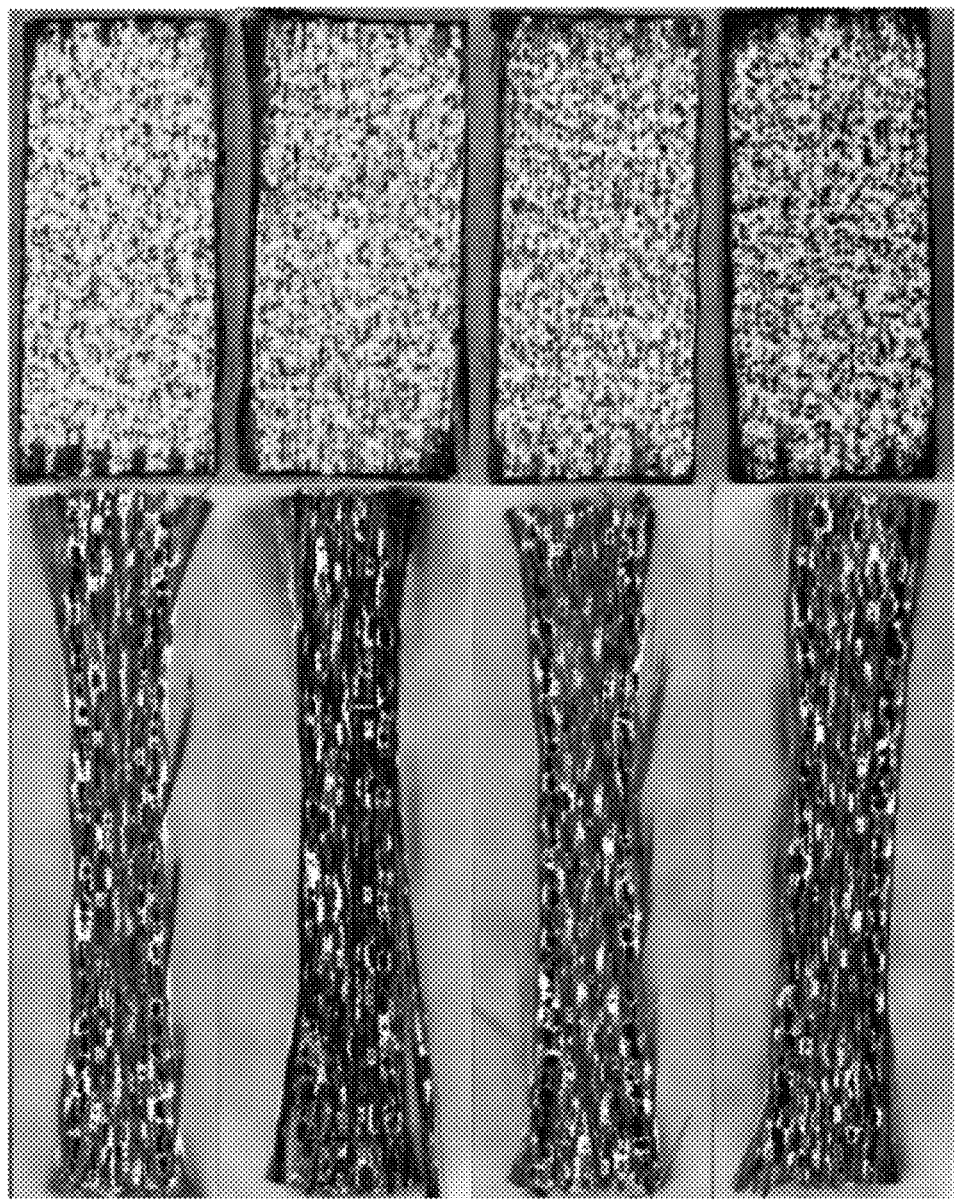
FIG. 9. Digestion of 5320-1/8HS (aircraft pre-preg) composites with $H_2O_2$/HOAc conditions at 110° C. Left to right: no catalyst, 1% $ScCl_3$, 1% ascorbic acid, 1% $MeReO_3$. Top: top view. Bottom: side view.
Figure 10:
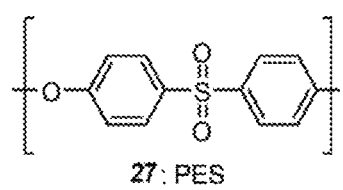
FIG. 10. Structure of PES.
Figure 11A:
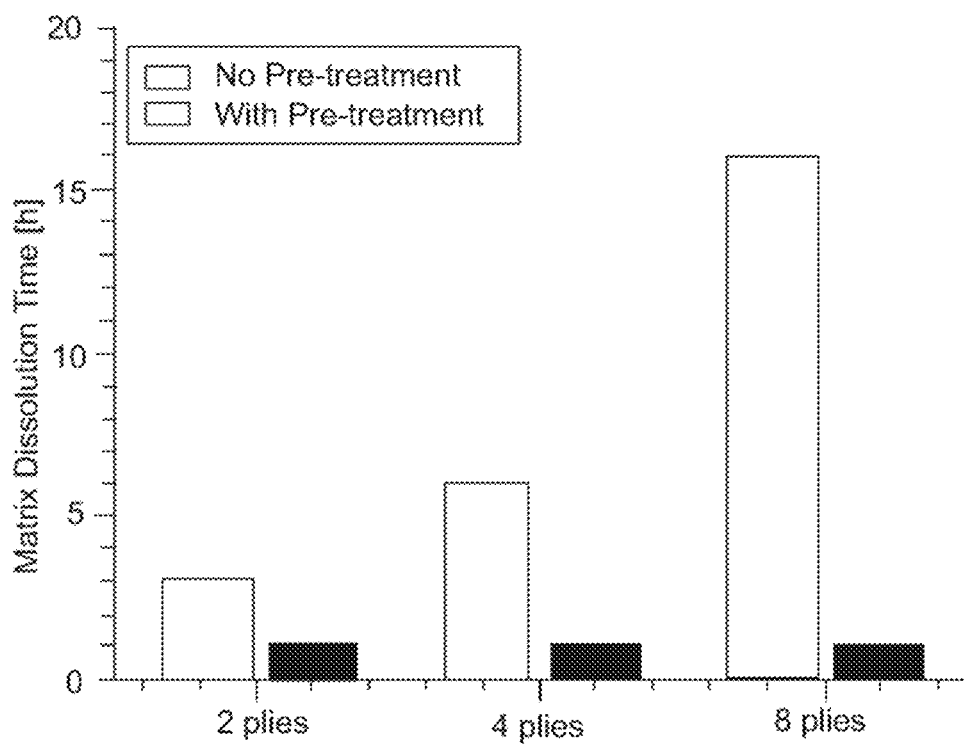
FIGS. 11A, 11B, 11C, and 11D. Effect of pre-treatment on matrix (⅛=100%) dissolution rate via acid digestion (A), cross-sectional images of laminates (B) before and (C) after pre-treatment, and carbon fiber fabrics recovered from (D) an 8-ply laminate using acid digestion with pre-treatment.
Figure 11B:
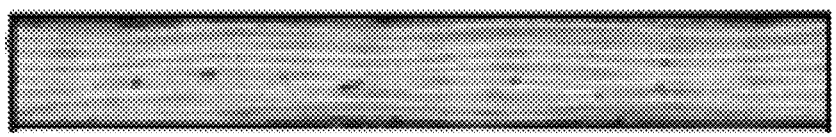
Figure 11C:
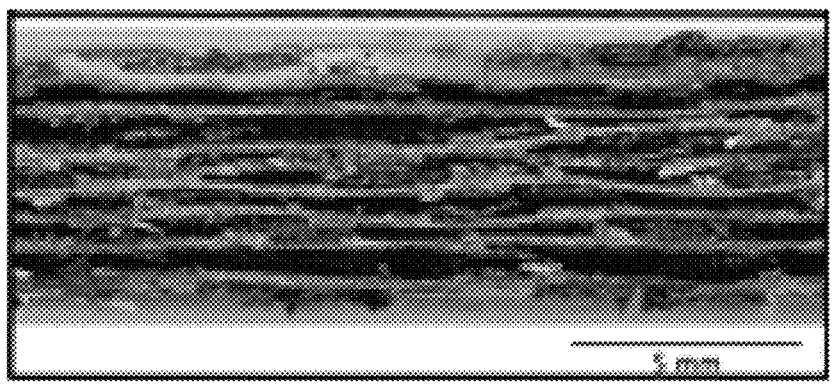
Figure 11D:

An example of the challenges with actual recycled materials is exemplified by digesting carbon fiber composites of 5320-1/8HS (aircraft OoA pre-preg) shown in FIG. 9. These photos show that most of the polymer matrix can be digested by peroxide oxidation with or without catalysts ($ScCl_3$, ascorbic acid, $MeReO_3$) and without disordering the fiber weave. In these photographs, it is observed that the digestive conditions homogenize the bulk of the matrix but leave behind a white powdery residue that is understood to be PES (polyether sulfone, FIG. 10) tougheners. These plastics can be solvolyzed away from the fibers, a known technology,[15] while tuning the digest conditions to preserve the diarylsulfone linkage common to PES (27) and DDS (4).

4.0 Sustainable Conditions: Manganese and Aluminum

An initial, low-resolution screen (Table 1) shows that $MnCl_2$ and CuCl are competent catalysts for aerobic cleavage of a model system, $Me_4DDS$ (20a). It is also discovered that ligating the metal with phenanthroline or a salen ligand improves the reactivity of the system in solution. Among these, it is found that unligated $MnCl_2$ will depolymerize epoxies in commercial aircraft prepreg composite (Cytec 5320-1/8HS) at various degrees of curing. It is further found that when $MnCl_2$ is used as the OAT catalyst, $AlCl_3$ is equally efficient as $ScCl_3$ as an elimination catalyst. Thus, conditions to effectuate this aerobic depolymerization with only abundant metals is identified.

TABLE 1

Time to demethylate $Me_4$-DDS (23) in HOAc solution with 10 wt % $ScCl_3$.

| Metal | (no ligand) | phen | salen |
|---|---|---|---|
| $FeCl_2$ | No rxn | — | — |
| $MnCl_2$ | 2 days | <1 day | <1 day |
| $RuCl_3$ | No rxn | — | — |
| CuCl | 2 days | <1 day | <1 day |
| $CoCl_2$ | No rxn | — | — |

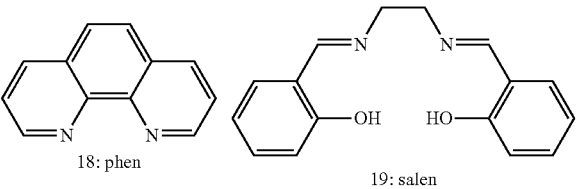

18: phen

19: salen

5.0 Optimizing Matrix Depolymerization Chemistry

Solvent Pre-Treatment.

A promising approach involves a two-step process in which the composite is first physically permeabilized (swelled) with solvent pre-treatment. During pre-treatment, composite laminates were placed in solvent (e.g., benzyl alcohol) at 200° C. for 4 hours. The pre-treated laminate was then subjected to digestion. The underlying purpose of pre-treatment is to accelerate intercalation of reagents into the composite. During the immersion process, the solvent penetrates the crosslinked network, enabling reactants to reach cleavable bonds more easily. Several solvents have been evaluated, with benzyl alcohol giving best results for the prototypical amine-linked epoxy materials. These solvents are heated at 40° C. above the matrix $T_g$, for 1.5 hours per millimeter thickness of the laminate. In a second step, pre-treated composites are subjected to digestion conditions to dissolve the epoxy matrix.

FIG. 11 shows the digestion of a CFRP based on a 1/18 epoxy system ($T_g$=160° C.) that was digested with $H_2O_2$/HOAc. After pre-treatment at 200° C., the laminate swelled (weight increase=100%) and expanded in thickness (thickness increase=120%). Subsequently, the dissolution time reduced to 1 h for all laminates, regardless of thickness FIG. 11A), confirming that pre-treatment effectively removed the diffusion limit in composites. No mechanical stirring was required for the pre-treatment step or for the subsequent chemical reaction step, and the fiber arrays remained organized. FIG. 11D shows the fabrics recovered from an 8-ply laminates. Unlike conditions without pre-treatment, peroxide digestion homogeneously decomposed and dissolved the polymer matrix, preserving the fiber weave and minimizing fiber damage from abrasion. This pretreatment approach can be used with the aerobic conditions set forth above. While benzyl alcohol presents a challenge because it is an antioxidant, other aromatics (xylenes) and glycols are known to be effective for composite pre-treatment. Further, while this strategy involves forcing conditions, $O_2$ need not be present during pre-treatment, which removes the safety issue of heating solvents in the presence of $O_2$.

6.0 Demonstrate Effective Re-Isolation of Engineered Materials from Oxidative Degradation of FRP Matrices Fiber Recovery. Analysis of Recovered Material Fibers from uncured and partially cured aerospace prepreg 5320-1/8HS have been recently recovered. Recall that a large fraction of prepreg, sometimes a third, is lost as production scrap, so we're interested in looking at digestion and re-processing of these partially cured materials. Unsurprisingly, it is observed that DMSO wash removes all organics when the prepreg is not heated (FIG. 12A). The woven fiber sheets became soft after wash and can be sheared manually. Organics are recovered by filtration as well, ca. 14% of the prepreg weight (FIG. 12B). These are oligomers of the matrix that formed at room temperature; monomers remained in solution. For prepregs cured at 110° C. for 3 h, organics remained on the fabric after wash, and the fiber tows could not be sheared (FIG. 12C). Organics are recovered by filtration, ca. 22% of starting weight (FIG. 12D). The remaining fabrics with residue (FIG. 12C). were subjected to aerobic digestion for 7 days. Clean fabrics were recovered (FIG. 12E) and the fiber tows could be separated. About 3 wt % of the original prepreg is recovered as digestion products (FIG. 12E). For prepregs cured at 121° C. for 3 h (ca 60% cured), there was almost no change after DMSO wash. After aerobic digestion (7 days), clean and soft fabrics were not achieved, although the prepreg was softer than the original prepreg. It can be concluded that aerobic digestion with DMSO wash is an effective method for recycling prepreg scrap.

Figure 13A:
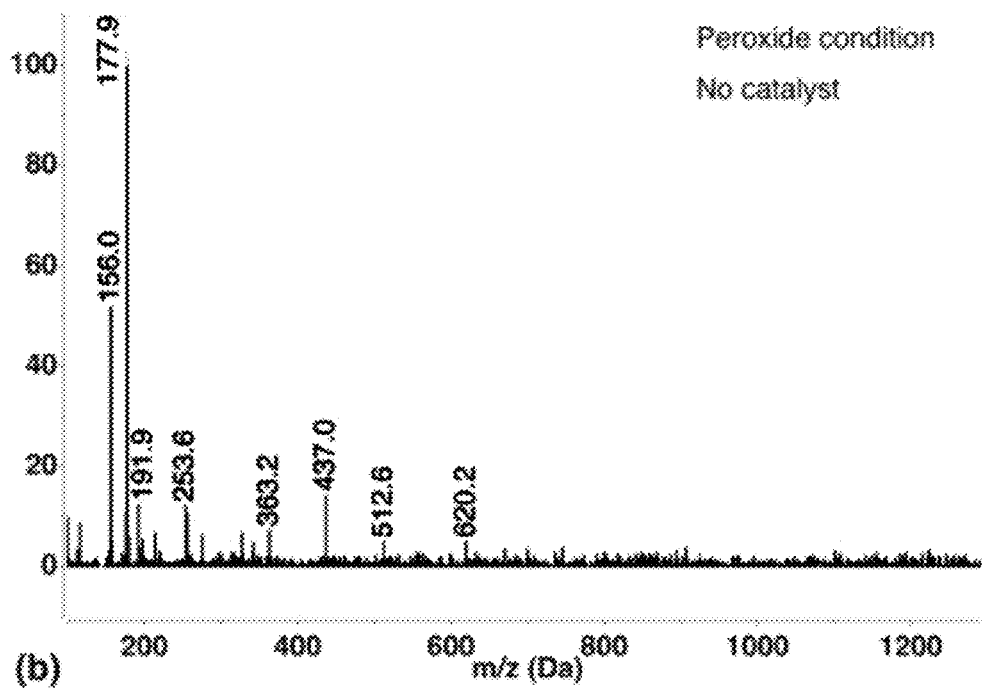
FIGS. 13A and 13B. MALDI MS spectra for digest filtrates of amine-linked epoxy matrices depolymerized with (a) $H_2O_2$/HOAc and (b) air, $MeReO_3/ScCl_3$. MALDI matrix is DBA.
Figure 13B:
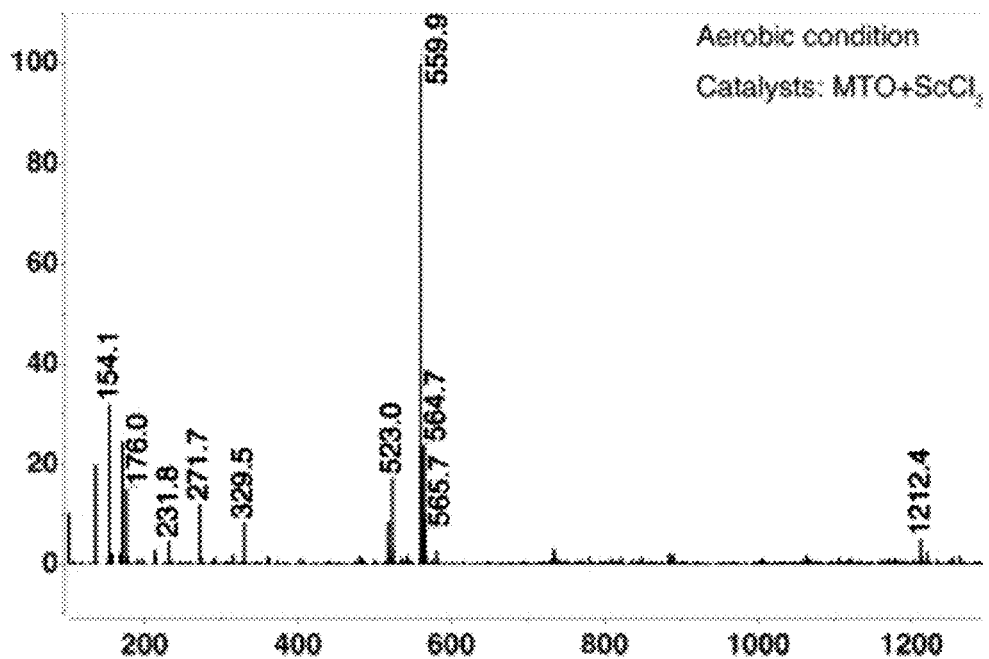

FIG. 13 illustrates the selectivity and separatory problems that are faced in monomer re-isolation. These are MALDI mass spectra in which one can see the quantity of compounds that arise from digestion of an amine-linked epoxy matrix derived from DDS (1) and a bi-directional bis(epoxide) (18). The upper MALDI MS spectrum (a) comes from a sample digested with $H_2O_2$/HOAc conditions, while the lower trace (b) shows products from an air-oxidation with $MeReO_3$ and $ScCl_3$. In these it is observed that peroxide conditions destroy most of the material in the digest, leaving the MALDI matrix (sodium dihydroxybenzoate buffer) as the two tallest peaks. By contrast, aerobic, catalytic digestion shows selectivity for a small molecule at ca. 560 m/z. This shows a key feature of these data: mild reaction conditions give selectivity that enables monomer recovery, which had not yet been observed in a thermoset epoxy composite.

Figure 14:
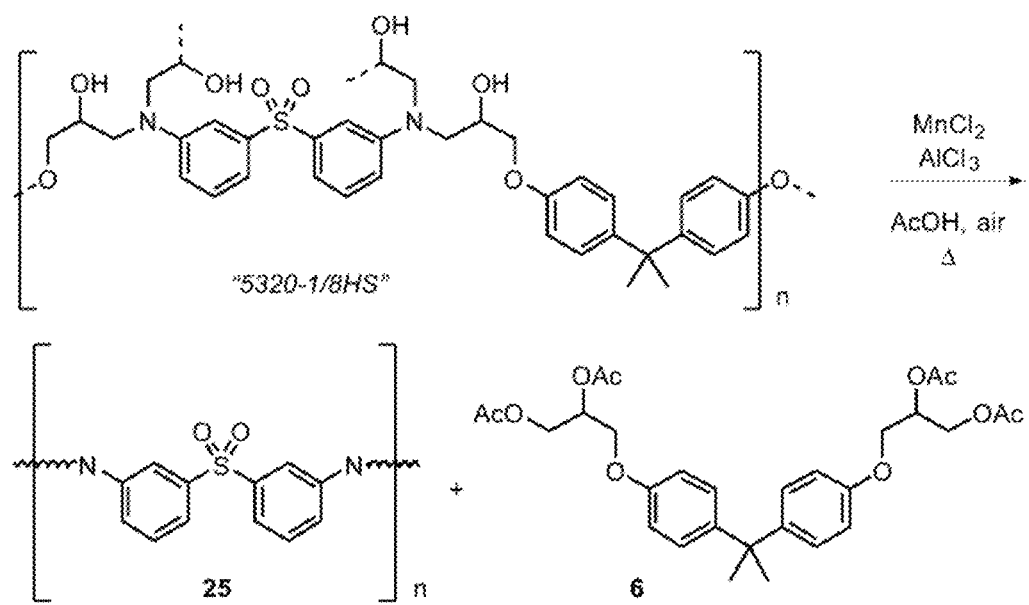
FIG. 14. Scheme 5 showing digest products.

Follow-up NMR studies allow identification of products that are formed by aerobic digestion. The conditions that have yielded the cleanest and highest yielding samples of digest monomers have been the $MnCl_2$/$AlCl_3$ conditions shown in Scheme 5 of FIG. 14. From such experiments one is able to collect tetraacetate 6 (544 m/z), which is identified as the 560 m/z peak from FIG. 13 (it apparently loses a methyl group and flies with $Na^+$ and $H_2O$ in MALDI). This structure was confirmed by a complement of 1-and 2-dimensional NMR techniques. The balance of the organic material is recovered as an insoluble polymer, which is proposed to be comprised of the DDS unit of the matrix, based on combustion analysis data showing nitrogen and sulfur. These data are remarkable, because this is the first case of recovering discrete small molecules from degradation of an amine-linked epoxy FRP material.

The DDS fragment, sketched as 25, remains to be characterized. The nature of this material is a brown powder; a sample is pictured in FIG. 12F. This material can be used as an accelerator for curing epoxy-based resin systems used in injection molding applications. Thus, regardless of whether or not a pathway to recover the parent DDS monomer from this material is found, this reaction product have value as a resin material for manufacture of new composites.

Reprocessing Re-Collected Oligomer Fragments.

Figure 12:
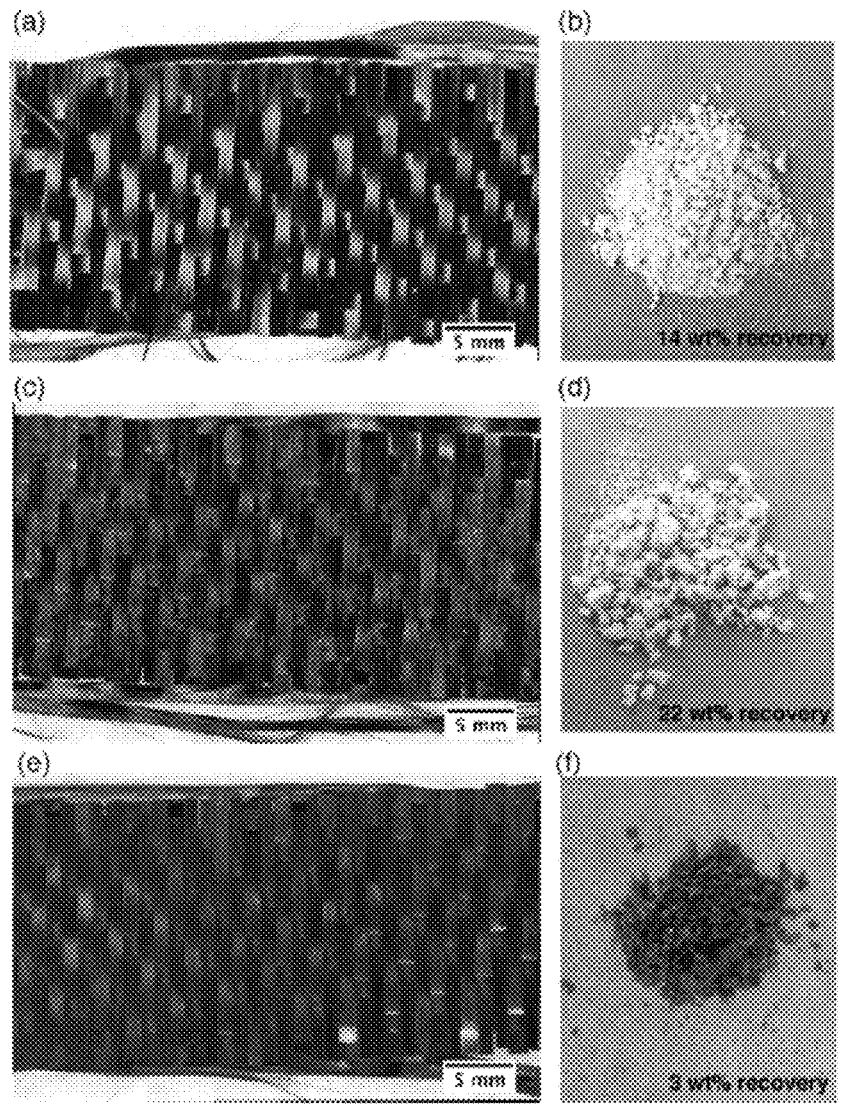
FIG. 12. Recovered clean fibers (a) and epoxy matrix (b) from room temperature aged prepregs after DMSO wash, recovered fibers with residue (c) and epoxy matrix (d) from 110° C. cured prepreg after DMSO, recovered clean fibers (e) and epoxy matrix (f) after applying aerobic digestion to sample (c).

FIG. 12 shows that white, polymeric material can be washed off of partially cured prepregs. Some of this material is PES (27) tougheners, but much of it is oligomers of matrix monomers. The aerobic digestion conditions can be applied to this isolated material to strip the epoxies down to monomers and leave the PES intact. This should enable facile recovery of the PES and recovery of digest products as sketched above.

Isolated Polymeric Materials as Accelerators.

After aerobic digestion in one example, the chemical feedstock was neutralized using a sodium hydroxide aqueous solution, and decomposed polymer residues were subsequently obtained through precipitation. The matrix materials recovered from amine-cured epoxies contain amines. Potentially, these residues can be employed as accelerators for anhydride-based bi-functional epoxies, e.g. 2. To validate this hypothesis, the recovered matrix residue was blended into virgin anhydride/epoxy resins (without accelerator) for potential reuse.

Figure 15:
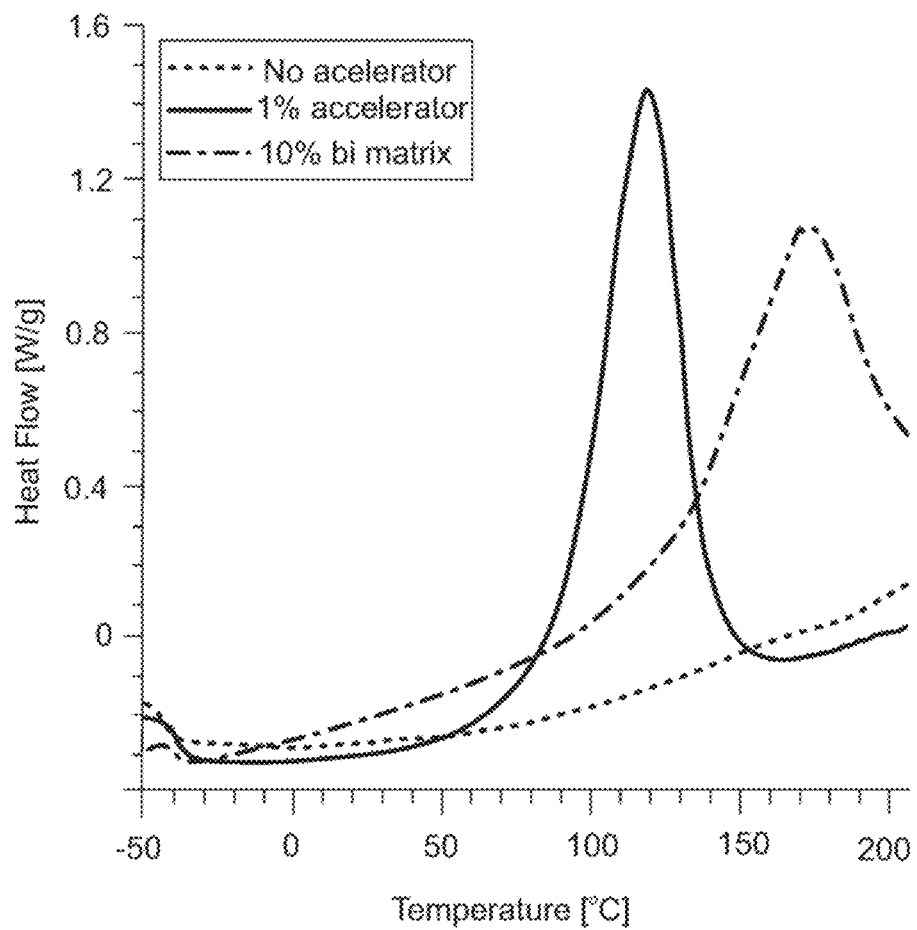
FIG. 15. mTGA peaks of curing Reactions showing reuse of recovered matrix residues as an accelerator for anhydride-based epoxy formulations.

In the absence of accelerators, no exothermic chemical reaction occurred, and the resin remained uncured, as expected. However, when 1 wt % commercial accelerator was added, the peak of the curing reaction occurred at 118.9° C., yielding a cured epoxy with $T_g$=127° C. When the commercial accelerator was replaced with the recovered matrix residue, the curing reaction could also be initiated. Based on the peaks of reaction, heats of reaction, and cured $T_g$ values, 10 wt % was the optimal mixing ratio for reusing the matrix residue as an accelerator in virgin anhydride-based epoxies, yielding a cured epoxy with $T_g$=115° C. FIG. 15 shows the representative heat flows for anhydride/epoxy samples without an accelerator, with 1 wt % commercial accelerator, and 10 wt % recovered matrix residue.

To determine the flexural properties of the cured epoxies, neat epoxy specimens were prepared for four-point bending tests. Anhydride-cured bi-functional epoxy specimens cured with a commercial accelerator and with recovered bi-functional matrix residue were obtained. Both cured specimens were homogenous and void-free. None of the bend test samples ruptured within the 5% strain limit required by the ASTM D6272 standard. The flexural modulus of the specimens cured with recovered matrix residues was slightly greater than specimens with the commercial accelerator. This is an important result, because it shows that the isolated amine-containing fraction of the digest can be used as a product, an accelerator, without any further optimization.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

[1]. Campbell F C. Manufacturing Technology for Aerospace Structural Materials. London: Elsevier; 2006.

[2]. Asmatulu E, Twomey J, Overcash M. Recycling of fiber-reinforced composites and direct structural composite recycling concept. J Compos Mater 2013; 48:593-608.

[3]. Oliveux, G.; Dandy, L. O.; Leeke, G. A. Current Status of Recycling of Fibre Reinforced Polymers: Review of Technologies, Reuse and Resulting Properties. Prog. Mater. Sci. 2015, 72, 61-99.

[4]. References for source images: A. Composites Today. http://www.compositestoday.com/wp-content/uploads/2015/02/dreamliner-848x478.jpg B. http://www.ift-photo.com/images/gallery/Energia/1B.jpg C. Electric Vehicle News. http://3.bp.blogspot.com/-uhlqAAieGxY/U5vTuTbehSI/AAAAAAAAK24/G5ij9PnU2yM/s1600/bmw-i3-might-be-cheaper-to-live-with-due-to-carbon-fiber-construction-73054_1.jpg

[5]. Lucintel. Global Prepreg Market 2014-2019 Trend, Forecast and Opportunity Analysis. 2014.

[6]. Pimenta, S.; Pinho, S. T.; Recycling Carbon Fibre Reinforced Polymers for Structural Applications: Technology Review and Market Outlook. Waste Manag. 2011, 31, 378-392.

[7]. (a) Witik, R. A.; Gaille, F.; Teuscher, R.; Ringwald, H.; Michaud, V.; Månson, J-AE. Economic and Environmental Assessment of Alternative Production Methods for Composite Aircraft Components. J. Clean Prod. 2012, 29-30, 91-102. (b) Witik, R. A.; Payet, J.; Michaud, V.; Ludwig, C.; Månson, J-AE. Assessing the Life Cycle Costs and Environmental Performance of Lightweight Materials in Automobile Applications. Compos. Part A Appl. Sci. Manuf 2011, 42, 1694-709.

[8]. Maekawa, K.; Shibata, K.; Kuriya, H.; Nakagawa, M. Assessment of Effects of Carbon Fibers Recovered from CFRP with Depolymerization under Ordinary Pressure on the Environmental (LCA). Proc. 60th Soc. Polym. Sci. Japan Annu. Meet. 2011, 6.

[9]. (a) Dang, W.; Kubouchi, M.; Sembokuya, H.; Tsuda, K. Chemical Recycling of Grass Fiber Reinforced Epoxy Resin Cured with Amine Using Nitric Acid. Polymer 2005, 46, 1905-1912. (b) Dang, W.; Kubouchi, M.; Sembokuya, H.; Tsuda, K. An Approach to Chemical Recycling of Epoxy Resin Cured with Amine Using Nitric Acid. Polymer 2002, 43, 2953-2958,

[10]. Shibata, K.; Nakagawa M. CFRP Recycling Technology Using Depolymerization under Ordinary Pressure. Hitachi Chemical Technical Report No. 56, 2014.

[11]. Huntsman International LLC. http://www.huntsman.com/advanced_materials/a/Our%20Technologies/High%20Performance%20Components/Imides%20and%20Benzoxazines/Benzoxazines Accessed 12 Dec. 2016.

[12]. (a) Sharma, V. B.; Jain S. L.; Sain, B. Methyltrioxorhenium Catalyzed Aerobic Oxidation of Organonitrogen Compounds. Tetrahedron Lett. 2003, 44, 3235-3237. (B) Jain, S. L.; Joseph, J. K.; Sain, B. Rhenium-Catalyzed Highly Efficient Oxidations of Tertiary Nitrogen Compounds to N-Oxides Using Sodium Percarbonate as Oxygen Source. Rhenium-Catalyzed Oxidations of Tertiary Nitrogen Compounds to N-Oxides. Synlett 2006, 2661-2663.

[13]. (a) Berkessel, A.; Sklorz, C. A. Mn.Trimethyltriazacyclononane/Ascorbic Acid: A Remarkably Efficient Catalyst for the Epoxidation of Olefins and the Oxidation of Alcohols with Hydrogen Peroxide. Tetrahedron Lett. 1999, 40, 7965-7968. (b) de Boer, J. W.; Brinksma, J.; Browne, W. R.; Meetsma, A.; Alsters, P. L.; Hage, R.; Feringa, B. L. cis-Dihydroxylation and Epoxidation of Alkenes by [Mn2O(RCO2)2(tmtacn)$_2$]: Tailoring the Selectivity of a Highly H$_2$O$_2$-Efficient Catalyst. J. Am. Chem. Soc. 2005, 127, 7990-7991.

[14]. Chen, B.; Wang, L.; Gao, S. Recent Advances in Aerobic Oxidation of Alcohols and Amines to Imines. ACS Catalysis 2015, 5, 5851-5876.

[15]. Zhou, j. l.; Cheng, C.; Zhang, H.; Sun, Z. Y.; Zhu, S. Yu, M. H. Dissolution Behaviour of Polyethersulfone in Diglycidyl Ether of Bisphenol-A Epoxy Resins. IOP Conf. Ser.: Mater. Sci. Eng. 2017, 213, 012038.

What is claimed is:

1. A method of aerobic depolymerization of fiber-reinforced polymer (FRP) composites, the method comprising:
providing a fiber-reinforced matrix for recycling, wherein the fiber-reinforced matrix for recycling includes a monomer repeat unit having the following formula:

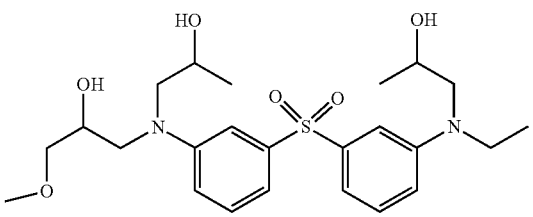

-continued

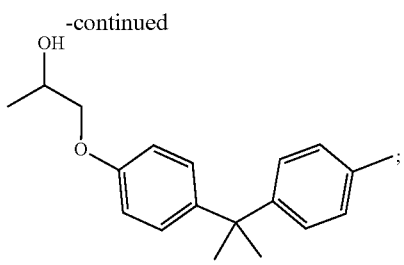

treating the fiber-reinforced matrix with a pretreatment solvent to permeabilize the FRP matrix;

degrading the FRP matrix under oxidative acidic peroxide conditions with a matrix digest solution that includes one or more catalysts and an oxygen source as a terminal oxidant to recover fibers at a first predetermined temperature, the one or more catalysts including $MnCl_2$; and removing the fibers from the matrix digest solution after the fiber-reinforced matrix has been solubilized; and harvesting resin monomers.

2. The method of claim 1 wherein the fibers are carbon fibers.

3. The method of claim 1 wherein the fiber-reinforced matrix is pretreated with a pretreatment solvent to permeabilize the FRP matrix.

4. The method of claim 1 further comprising continuing to treat matrix digest solutions with oxidative conditions at a lower temperature than the first predetermined temperature and at tunable $O_2$ and catalyst concentrations to provide a controlled release of useful monomers.

5. The method of claim 1, wherein the fiber-reinforced matrix is an amine-linked epoxy matrix.

6. The method of claim 1, wherein the one or more catalysts include a transition metal-containing catalyst.

7. The method of claim 1, wherein remaining matrix material is treated with a dealkylation agent.

8. The method of claim 7, wherein the dealkylation agent is a hydroxide salt.

9. The method of claim 1, wherein remaining matrix material is treated with a strong base to separate resin monomers from linking glycerol-based fragments.

10. The method of claim 1, wherein resin monomers harvested are aromatic compounds.

11. The method of claim 1, wherein conversion of isolated resin monomers to resin precursors is through re-alkylation.

12. The method of claim 1, wherein the oxygen source is air.

13. The method of claim 1, further comprising recovering organic materials.

14. The method of claim 13 wherein the recovered organic materials are used as an accelerator for polymer curing.

15. The method of claim 1 wherein the pretreatment solvent is selected from the group consisting of benzyl alcohol, aromatic solvents, glycols, and ethers.

16. A method of aerobic depolymerization of fiber-reinforced polymer (FRP) composites, the method comprising:

providing a fiber-reinforced matrix for recycling that includes a monomer repeat unit having the following formula:

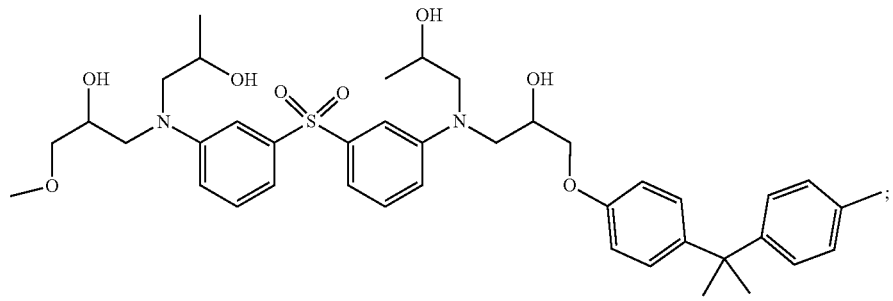

degrading FRP matrix with a matrix digest solution that includes one or more catalysts, and an oxygen source as a terminal oxidant to recover fibers at a first predetermined temperature, wherein the one or more catalysts include; $MnCl_2$; and removing the fibers from the matrix digest solution after the fiber-reinforced matrix has been solubilized; and recovering a tetraacetate having formula 6

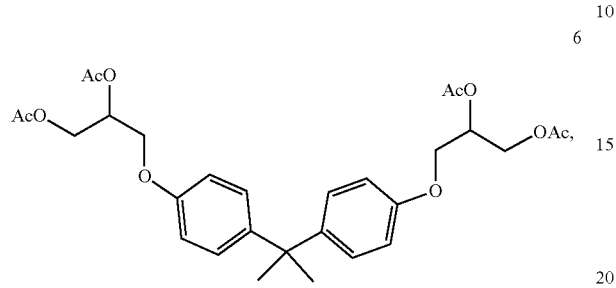

where OAc is acetate.

* * * * *